United States Patent [19]
Wootton et al.

[11] Patent Number: 6,128,298
[45] Date of Patent: Oct. 3, 2000

[54] INTERNET PROTOCOL FILTER

[75] Inventors: Bruce Anthony Wootton, Raleigh, N.C.; William G. Colvin, Milton, Canada

[73] Assignee: Nortel Networks Corporation, Montreal, Canada

[21] Appl. No.: 08/842,328

[22] Filed: Apr. 24, 1997

Related U.S. Application Data

[60] Provisional application No. 60/015,945, Apr. 24, 1996.

[51] Int. Cl.$^7$ ..................................................... H04L 12/56
[52] U.S. Cl. ......................... 370/392; 370/390; 370/401; 713/201
[58] Field of Search .................................. 370/351, 352, 370/355, 389, 390, 392, 393, 400, 401, 402, 409; 395/200.6, 200.62, 200.68, 200.72; 713/201

[56] References Cited

U.S. PATENT DOCUMENTS

| | | | |
|---|---|---|---|
| 5,309,437 | 5/1994 | Perlman et al. | 370/401 |
| 5,383,179 | 1/1995 | Saini et al. | 370/393 |
| 5,400,334 | 3/1995 | Hayssen | 370/245 |
| 5,606,668 | 2/1997 | Shwed . | |
| 5,623,601 | 4/1997 | Vu . | |
| 5,778,174 | 7/1998 | Cain . | |
| 5,781,550 | 7/1998 | Templin et al. | 370/401 |
| 5,793,763 | 8/1998 | Mayes et al. | 370/389 |
| 5,826,014 | 10/1998 | Coley et al. . | |
| 5,835,726 | 11/1998 | Shwed et al. . | |

FOREIGN PATENT DOCUMENTS

| | | |
|---|---|---|
| 0 465 201 | 1/1992 | European Pat. Off. . |

OTHER PUBLICATIONS

Axner, "Differing Approaches to Virtual LANs", *Business Communications Review*, Dec. 1993, pp. 42–45.

Bryan, "Build a Firewall", *Byte*, Apr. 1995, pp. 91–96.

Bryan, "Firewalls for Sale", *Byte*, Apr. 1995, pp. 99–104.

Carl–Mitchell, et al., "Building Internet Firewalls", *Unix-World*, Feb. 1992, pp. 93–103.

Chapman, "Network (In)Security Through IP Packet Filtering", UNIX Security Symposium III Proceedings, Baltimore, MD, Sep. 14–16, 1992, pp. 63–76.

Cheswick, "The Design of a Secure Internet Gateway", USENIX Summer Conference, Anaheim, CA, Jul. 11–15, 1990, pp. 233–237.

Ho, "Implementation of a Secure Gateway on Hughes Aircraft's Engineering Design Network", 15$^{th}$ Conference on Local Computer Networks, IEEE, Minneapolis, MN., Sep. 30–Oct. 3, 1990, pp. 180–182.

Hoover, "Securing the Enterprise, Firewalls Can Keep You from Getting Burned", *Internet World*, Feb. 1995, pp. 39–47.

Koblas, et al., "SOCKS", UNIX Security Symposium III Proceedings, Baltimore, MD, Sep. 14–16, 1992, pp. 77–83.

Lottor, "TCP Port Service Multiplexer (TCPMUX)", Internet rfc 1078 (1988), pp. 1,2.

Luotonen, et al., "World–Wide Web Proxies", Computer Networks and ISDN Systems 27 (1994), pp. 147–154.

(List continued on next page.)

*Primary Examiner*—Ajit Patel
*Assistant Examiner*—Bob A. Phunkulh
*Attorney, Agent, or Firm*—Foley & Lardner

[57] ABSTRACT

The IP filter, embodying the present invention, is a communications device designed to provide public network or Internet access to nodes of private networks, advantageously without requiring the private nodes on such networks to register public Internet addresses. The IP filter presents a single IP address to the Internet and uses a plurality of IP ports to solve the problem of IP address conservation. It initiates sessions by assigning private side IP sessions to a unique port of the IP filter's public address. The IP filter effects a translation between a source port number for the private network and a destination port number for the public network for communication therebetween. Benefits of the IP filter include private node security and conservation of Internet-registered addresses.

32 Claims, 2 Drawing Sheets-

OTHER PUBLICATIONS

Marotta, et al., "Internetworking Data Services", 16th Conference on Local Computer Networks, IEEE, Minneapolis, MN, Oct. 14–17, 1991, pp. 223–229.

Panzieri, et al., "Interfacing UNIX to Data Communications Networks", *IEEE Transactions on Software Engineering,* vol. SE–11, Oct. 1985, pp. 1016–1032.

Schauer, et al., "An Internet Gatekeeper", UNIX Security Symposium III Proceedings, Baltimore, MD, Sep. 14–16, 1992, pp. 49–61.

Schroeder, et al. "Autonet: A High Speed, Self–Configuring Local Area Network Using Point–to–Point Links", *IEEE Journal on Selected Areas in Communications,* vol. 9, No. 8, Oct. 1991, pp. 1318–1334.

Shapiro, "Structure and Encapsulation in Distribution Systems: The Proxy Principle", The 6th International Conference on Distributed Computing Systems, IEEE, Cambridge, MA, May 19–23, 1986, pp. 198–204.

Snyder, "Choosing the Right Firewall to Defend Your Network" *Network World,* vol. 12, No. 10, Mar. 5, 1995, p. 1.

Stephensen, "A Blueprint for Firewalls", *LAN Magazine,* Feb. 1995, pp. 63–70.

Tam, et al. "CAPNET—An Approach to Ultra High Speed Network", *IEEE International Conference on Communications,* 1990, pp. 323.1.1–323.1.7.

Tolly, "Evaluating Port Switching Hubs—A reality check for virtual workgroups", *Data Communications,* Jun. 1993, pp. 52–62.

Treese, et al., "X Through the Firewall, and Other Application Relays", USENIX Summer 1993 Technical Conference, Cincinnati, OH, Jun. 21–25, 1993, pp. 87–98.

Cheswick and Bellovin, "Firewalls and Internet Security: Repelling the Wily Hacker", Addison–Wesley, 1994, pp. 34–36, 54–75.

Comer, "Internetworking with TCP/IP", Prentice–Hall, Inc., 1988, pp. 120–127, 137–141, 194, 195, 208–214, 346, 347.

McClimans, "Workarounds Ease the IP Address Shortage", *Data Communications,* section Software Views, vol 24, No. 2, Feb. 23, 1995, (p. 33), pp. 3–5.

Kostick, "Building a Linux Firewall", *Linux Journal,* Apr. 1996, pp. 49, 52, 53, 55, 57, 58, 61.

Egevang et al., "Internet Engineering Task Force, USA" XP2040992 pp. 1–8 (1994).

Stallings, "Internet Security Handbook" XP2040993 pp. 27–37 (1995).

INTERNET PROTOCOL FILTER

This application is based on provisional application 60/015,945 filed Apr. 26, 1996.

BACKGROUND OF THE INVENTION

The present invention generally relates to internetwork firewalls and, in particular, to an internet protocol (IP) filter whereby a private IP network domain is mapped to a single IP address on the public Internet.

Firewalls are generally known and characterized by computer servers which function to couple nodes within the domain of the private network to nodes in a public network domain, such as the Internet. A deficiency of the known firewall products is the need for a unique public IP address for each concurrent session or interaction between public and private nodes.

A firewall providing conservation of public IP addresses would be desirable.

SUMMARY OF THE INVENTION

It is an object of the present invention to provide a new and improved apparatus for communicatively coupling two networks.

The invention, therefore, according to a first exemplary aspect provides a method of interfacing private and public data communications networks, through a filter node in communication with both networks, the filter node having an address known in the public network, comprising the steps of: routing from nodes in the private network, to the filter node, data packets having destination information, which includes a destination address and a destination port, corresponding to nodes in the public network and having source information, which includes a source address and a source port, of the respective private network nodes; for each data packet received from the private network, at the filter node, maintaining the source information taken from the data packet in correlation with a unique value representing a port of the filter node, and replacing in the data packet the source address with the filter node address and the source port with the filter node port value; and routing from the filter node, in the public network, the data packets having the replaced source information, according to the destination information in each, to the corresponding public network nodes.

According to a second exemplary aspect, the invention provides a method of interfacing private and public data communications networks, through a filter node in communication with both networks, comprising the steps of: (a) receiving at the filter node, from the private network, a data packet having an a destination address corresponding to a node in the public network and a source address corresponding to a node in the private network; (b) maintaining, by the filter node, the source address taken from the data packet; (c) replacing, in the data packet, the source address with an address of the filter node; (d) routing from the filter node, in the public network, the data packet having the replaced source address, according to the destination address, to the corresponding public network node; (e) waiting for a return packet from the public network, responsive to the data packet having the replaced source information; (f) replacing, in the return packet, the destination address with the maintained source address; and (g) routing from the filter node, in the private network, the return packet having the replaced destination address to the corresponding private network node.

According to a third exemplary aspect, the invention provides a method of operating a filter node for interfacing first and second data communications networks, comprising the steps of: receiving from the first network, a data packet having destination information, which includes a destination address and a destination port, corresponding to a node in the second network and having source information, which includes a source address and a source port, corresponding to a node in the first network; maintaining the source information taken from the data packet in correlation with a unique value representing a port of the filter node; replacing in the data packet the source address with an address of the filter node and the source port with the filter node port value; and sending to the second network the data packet having the replaced source information, whereby that packet is routed according to its destination information to the corresponding second network node.

According to a fourth exemplary aspect, the invention provides a filter node for interfacing first and second data communications networks, comprising: means for receiving from the first network, a data packet having destination information, which includes a destination address and a destination port, corresponding to a node in the public network and having source information, which includes a source address and a source port, corresponding to a node in the first network; means for maintaining the source information taken from the data packet in correlation with a unique value representing a port of the filter node; means for replacing in the data packet the source address with an address of the filter node and the source port with the filter node port value; and means for sending to the second network, the data packet having the replaced source information, whereby that packet is routed according to its destination information to the corresponding second network node.

An IP filter, embodying the present invention, is a communications device designed to provide public network or Internet access to nodes of private networks, advantageously without requiring the private nodes on such networks to register public Internet addresses. The IP filter presents a single IP address to the Internet and uses a plurality of IP ports to solve the problem of IP address conservation. It initiates sessions by assigning private side IP sessions to a unique port of the IP filter's public address whereby up to 64,512 (=65,536 total −1,024 well known ports) concurrent sessions may be supported through the single IP address. The IP filter effects a translation between a source port number for the private network and a destination port number for the public network for communication therebetween. Benefits of the IP filter include private node security and conservation of Internet-registered addresses.

In a particular embodiment, the IP filter may support three data transport protocols over the internet protocol: transmission control protocol (TCP), user datagram protocol (UDP) and Internet control message protocol (ICMP). Packets of other protocols may be ignored.

The TCP protocol prepends a TCP header to a data packet. The source port and destination port numbers are contained in this header. The Internet addresses of the source and destination nodes are contained in the IP header. The IP address and port information extracted from each packet will be used to determine where the IP filter should route this packet.

The IP filter maintains a lookup table of information on each TCP connection. This information includes the port from the private node, the private IP address, the assigned port number of the destination node, and the port number of the IP filter in the form of an index. When a packet is received from the private network, the private address and port number are added to the table as a new entry, if an entry corresponding to this packet is not found in the table and if the TCP header indicates that this is a new connection request. Then the source address and port number in the packet header are replaced with the IP filter's IP address and port number, and the packet is transmitted to the Internet.

When the IP filter receives a packet from the Internet, the destination port number is used to index the lookup table. When the corresponding table entry is found, the destination address and port number are replaced with the private network's IP address and port number, and the packet is transmitted to the private network. If the received packet's source port is different from the port recorded in the table, and if the packet header information indicates that this packet is the first response on the connection, then the lookup table is updated with the port number assigned by the Internet node, if needed. When the IP filter detects an end of transmission code in the packet, the lookup table entry is zeroed. If the IP filter receives packets from the Internet that do not have entries in the lookup table corresponding to the IP filter port, it ignores the packets.

The UDP protocol is connectionless, as opposed to TCP, a connection-oriented protocol. The UDP header contains no codes governing initial connection or end of transmission. The data of interest in the UDP header are the source port and destination port. This information, along with the Internet addresses contained in the IP header, are used to determine where the IP filter should route this packet.

The IP filter maintains a lookup table of information on each UDP session. When the IP filter receives a UDP packet from the private network, it records the source address, the source port number, the destination port number, and the assigned IP filter port number as the index to the table. Then the private node address and port number in the packet header are replaced with the address and assigned port number of the IP filter. Then the packet is transmitted to the Internet.

When the IP filter receives a UDP packet from the Internet, it indexes the UDP lookup table and replaces the packet's destination information, namely the IP filter address and assigned port number, with the private address and port number from the lookup table. The lookup table also maintains an interval indication for an expiration timer on datagram packets received as per standard UDP implementations. If the IP filter receives packets from the Internet that do not have entries in the lookup table corresponding to the IP filter port, it ignores the packets.

As ICMP packets do not contain port numbers of either source or destination, any ICMP packets received from the private network are processed one at a time, with buffering of additional ICMP packets. The IP filter reads the private address from the packet header and replaces it with the address of the IP filter. The packet is transmitted to the Internet, and the IP filter waits for the response. When it receives the responding packet, the destination address in the packet header is changed from that of the IP filter to that of the node on the private network. Then the IP filter transmits the packet to the private network.

To successfully deliver packets over an IP protocol network, each node must maintain a table of other hosts' IP addresses and their corresponding Ethernet addresses in an Ethernet based data communications network. The nodes actually use the IP addresses and the Ethernet addresses to address packets. The relationship between the two addresses is dynamic; that is, a node with an IP address may change its Ethernet address. The information in the address table is obtained from the replies to the node's broadcast of ARP packets. The source node broadcasts ARP packets to request the Ethernet address of the destination node, given the destination node's IP address. If the destination node receives the packet, it sends a reply packet with the requested information.

Though it does not maintain a true ARP table, the IP filter passes ARP packets in a manner similar to TCP and UDP packet passing. When the IP filter receives an ARP packet from a node on the private network destined for the public network, it replaces the source address information with the filter's address information. The private node's IP address and the target IP address are placed in a lookup table. When the target node replies with its own Ethernet address, the destination address information is changed from that of the IP filter to that of the private node before transmitting the packet to the private node. The private node address information is obtained from the table. When an ARP packet is destined for the firewall, the ARP packet does not pass through the IP filter but is restricted to communications between the filter and the one side of the network.

Events and errors encountered by the IP filter may be logged, for example, by writing them into a text file.

The IP filter ideally will process packets as fast as the networks present them but when network traffic is too heavy, the IP filter will then buffer the packets in two queues, one for the private network and one for the Internet.

Two source and destination lookup tables may be utilized, one for TCP packets and the other for UDP packets. Each table is directly indexed by the IP filter port number assigned to the communication session. The table entries contain the IP address of the private node, the source port of the private node, and the destination port of the Internet node. If there is no connection on a certain IP filter port, then the corresponding entry in the table may be zeroed. Packets arriving from both the private network and the Internet are processed using the same lookup table. This arrangement assumes that of the available IP filter communications ports some are designated for UDP communication and some for TCP communication.

BRIEF DESCRIPTION OF THE DRAWINGS

The invention will be better understood from the following description together with reference to the accompanying drawings, in which.

DETAILED DESCRIPTION

Figure 1:
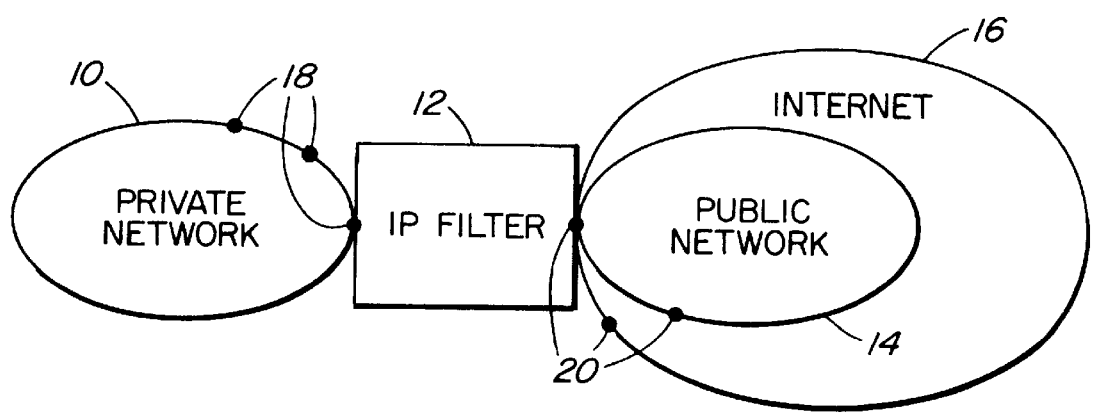
FIG. 1 is a schematic representing an internet protocol filter coupling a private network and a public network.

Referring to FIG. 1, shown for illustration of the present invention is a private network 10 communicatively coupled through an internet protocol (IP) filter 12 to a public network 14 which may form part of a global data network, otherwise referred to as the Internet 16. The private network 10 represents a conventional data communications network, such as a local area network (LAN), having a plurality of nodes 18 each being identified by a unique IP address within the domain of the private network 10. The public network 14 and Internet 16 are representative of public domain data communications networks also having a plurality of nodes 20 with corresponding IP addresses.

The IP filter 12 acts as a gateway through which data packets are exchanged between the private network 10 and the public network 14, thereby providing Internet access to the nodes 18 of the private network 10. The IP filter 12 constitutes one of the private network nodes 18 and is the only such node to have a public IP address that is Internet-registered, whereby the IP filter 12 essentially also constitutes one of the public nodes 20 and its IP address is known in the public domain. The IP addresses of the other private network nodes 18 are reserved for the private network 10, and not known or registered in the public Internet address domain. As is conventional, associated with the IP address of the IP filter 12 are a plurality of IP ports, specifically 65,536 in total of which 64,512 are not reserved for pre-defined protocols and can be used for address translations.

Communications between nodes 18 on the private network 10 are unaffected by the presence of the IP filter 12, but to access the public network 14 and particularly the nodes 20 therein, the private nodes 18 route all communications requests through the IP filter 12. The IP filter 12 manages the communications between private nodes 18 and the Internet nodes 20 by modifying header information of data packets received from the private network 10 before transmitting each to the public network 14. The modifications cause the communications between the private nodes 18 and the public Internet nodes 20 to actually be between the IP filter 12 and the Internet nodes 20, which route all return communications to the IP filter 12 which subsequently routes the return data packets to the private nodes 18.

The IP filter 12 accepts no connection requests from the public network 14. All communications between private nodes 18 and public nodes 20 are initiated by the private nodes 18. The IP filter 12 is designed to support three data transport protocols over the internet protocol: TCP, UDP and ICMP messages; packets of other protocols are rejected or ignored.

A translation table is maintained by the IP filter 12 to map address and ports for packets received from the private network 10 destined to the public network 14 and vise versa. The translation table contains the following for each entry:

| | |
|---|---|
| private IP address | (pIP) |
| private port | (pPort) |
| internet (public) IP address | (iIP) |
| internet (public) Port | (iPort) |
| timer | |
| session type/state | |
| Ethernet address | |

The basic translation substitutes IP addresses and ports from the private network side to the IP filter's IP address and ports, thereby hiding all nodes 18 on the private network 10 from the public network 14.

A packet originating on the private network side specifies a source—destination of $$(pIP, pPort—iIP, iPort)$$

This defines a "socket" in which the endpoints of the connection (source and destination) are defined by the IP addresses in the IP header and the ports in the TCP or UDP header.

The IP filter 12 will translate the above to $$(frIP, frPort—iIP, iport)$$

where frIP is the IP address of the IP filter 12 on the public network 14, and frPort is the index into the translation table plus an offset value, for example, of 1024 to skip using well known ports. The frPort represents an arbitrary port.

The internet node 20 will reply with a packet $$(iIP, iPort—frIP, frPort)$$

which will be received by the IP filter 12 and translated thereby to $$(iIP, iport—pIP, pPort)$$

In general, to translate from the private side, the values (protocol type, pIP, pPort, iIP, iport) must be located in the translation table. This should be done with a hash table lookup.

Translating from the public side can be a direct table lookup since frPort minus 1024 is the index into the table. If (iIP, iport) in the packet does not match the corresponding entries in the table, then an unauthorized access is logged and the packet dropped.

In translating packets, when a port is substituted in the TCP or UDP header, the checksum in both the TCP/UCP and IP header must be recalculated. When an IP address is substituted in the IP header, the IP header checksum must be recalculated.

Following are special considerations for different protocols supported by the IP filter 12.

In respect of TCP, when a SYN packet is received from the private network 10, the IP filter 12 locates an unused entry in the table and fills it in, setting the type to TCP and state to SYN. Then the packet is forwarded by the general scheme above. If no free entries exist in the table, then the packet is dropped and the event is logged.

If a SYN packet is received from the public network 14 interface, it is treated as unauthorized and logged (except for FTP special case described below). However, a SYN+ACK packet is forwarded if the state of the translation table entry is SYN. After forwarding such a packet the state set to OPEN.

If a FIN packet is received by the IP filter 12 and if the state in the translation table is not FIN, the state is set to FIN and the packet forwarded. If the state is FIN, then the packet is forwarded and the translation table entry is deleted by setting it to 0. A FIN must be sent by each side to close a TCP connection.

If a RST packet is received, then the translation table entry is deleted.

Having regard now to the UDP protocol, when any UDP packet is received from the private network 10 side, the IP filter 12 first tries its standard lookup. If a translation table entry is not found, an unused entry is set up and the state set to OPEN. If a free entry is not found in the table, then rather than dropping the packet, a random UDP in the table is overwritten. Since UDP is connectionless and consequently an unreliable transport, if a packet is received from the public network 14 that would have needed the entry that was overwritten, that packet will be dropped and the node 18 on the private side will need to retry.

With regard to FTP, an FTP client establishes a TCP "control" connection with an FTP server on a particular port, for example, port 21. However, when data is to be transmitted, the FTP server will open a TCP connection from its "data" port, for example, which is default 20, to a destination port specified by the client.

To support this, packets sent by the private network 10 to port 21 need to be analyzed for an FTP "port" command at the IP filter 12. If detected, then a new entry in the table must be set up with pPort set to the value in the FTP port command. The IP address and port number in the FTP command must be changed to the IP filter's address and port before forwarding the packet. The state is set to FTPDATA.

When a SYN packet is received from the public network 14, if a table entry exists and is in FTPDATA state, then the packet is forwarded and the state set to OPEN.

For the ICMP protocol, if an ICMP packet is received from the private network 10 and if that packet is an echo request (ping), then the IP filter 12 locates a new entry in the translation table. The sequence field of the packet is stored in pPort in the table and the table index is put in the sequence field of the packet. The ICMP checksum is recalculated and the standard IP header substitution is done. The type is set to ICMP and state to PING and the timer set to 1 minute.

If an echo reply (ping) is received from the public network 14 interface, then the sequence field is used as the index into the table. If the state is PING, then pPort in the table is substituted into the sequence field of the packet, the ICMP checksum recalculated and the standard IP header substitution is done. The table entry is then deleted.

If an echo request (ping) is received from the public network 14, then the IP filter 12 will reply. This allows internet access to confirm that the IP filter 12 is reachable and running.

If a Destination Unreachable packet is received from the public network 14, then the header information contained is extracted. If the protocol was TCP or UDP, the (frIP, frPort—iIP, iport) of the originating packet can be determined and the translation table entry located.

If the IP address extracted from the ICMP matches the address in the table, the IP filter 12 forwards the packet to the private network 10 using the standard scheme.

All other ICMP packets received from either side are dropped and logged.

Since most data communications protocols are based on either the UDP or TCP protocols, these other protocols are compatible with the IP filter 12 as long as they do not initiate negotiations like FTP to have the server open a connection back to the client. Examples of other compatible protocols include: Telnet; TFTP (Trivial File Transfer Protocol); DNS (Domain Name Services); and Web browsers.

Whenever a packet is transmitted in either direction, the timer field of the translation table entry is set to the configured timeout value (except ping). Each minute, the timer field of all active entries in the tables are decremented and if they become 0, then the translation table entry is deleted. This will clear out UDP and PING entries which are no longer in use and also TCP entries which have had an abnormal termination and did not send FIN from each side. It could be a security hole to leave an unused entry in the table for too long. A good timeout value to be configured would be just longer than the typical TCP keep alive.

According to a particular embodiment, the private network 10 and the public network 14 are Ethernet based LANs. The IP filter 12 may be implemented by a data processing platform which is equipped with two conventional Ethernet hardware interfaces connected to networks 10 and 14, respectively, and which is provisioned with appropriate software to implement the functionality of the IP filter 12.

Figure 2:
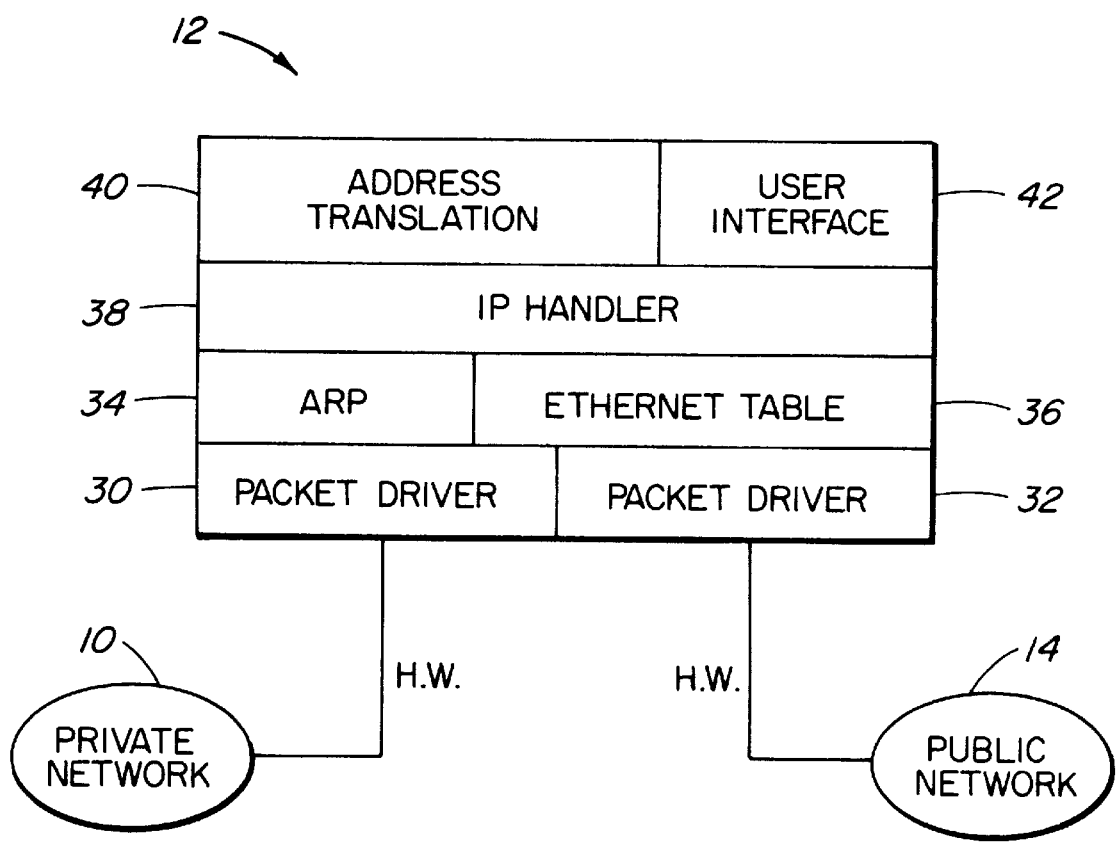
FIG. 2 is a block diagram representing internal components of the filter.

Internal components of the IP filter 12 in terms of software executable by the data processing platform are shown in FIG. 2. The internal components include two packet drivers 30 and 32, an address resolution protocol (ARP) table 34, an Ethernet address table 36, an IP handler 38, an address translation 40 and a user interface 42. The packet drivers 30 and 32 control the Ethernet hardware interfaces in order to communicate with, respectively, the private network 10 and the public network 14. The IP handler 38 provides a router functionality for receiving and forwarding messages, and maintains the ARP table 34 and the Ethernet table 36. The address translation 40 effects translation between source port numbers from the private network 10 and the destination port numbers on the public network side 14. The user interface 42 enables an operator, via a keyboard and display terminal attached to the processing platform, to interface with the IP filter 12. Functions keys are provided to configure the IP filter, view or copy log files, display status, etc. The log file will contain the connect time of TCP or UDP sessions, inbound and outbound traffic statistics, and invalid access to the IP filter 12. To prevent the log file from growing too large, this information will be logged to a new file when the date changes.

Routing of packets to and from the IP filter 12 is described in the following in terms of a public interface, from the view of the public network 14, and of a private interface, from the view of the private network 10.

The public interface behaves as a host on the LAN segment. To forward a packet, it checks to see if the destination IP is on the local LAN segment. If it is, it looks up the IP address in its ARP table to find the Ethernet address. If there is no entry in the ARP table, it must put the packet on a queue and send out an ARP request to get the Ethernet address. Standard aging out of ARP table entries needs to be done. If the IP destination is not on the LAN segment, it will forward the packet to the configured default router. ICMP Redirect messages sent by the default router will be ignored.

The private interface effects the functionality of a router, as it needs to be able to forward packets to one or more routers to communicate with the remote client stations. A large remote client network may access multiple router machines. Conventional routing can result in large routing tables because the routing entries become host addresses instead of subnet addresses. That is, if the network is set up so that a client may come in through either Router1 or Router2, then no single router can be the router for the subnet that that client station is on. A conventional router that would get routing tables via RIP from all routers on the private network would end up with a large table of host addresses for each remote client connected. This can affect performance in the search time necessary to find the route, the memory required for large tables and the amount of RIP traffic on the LAN segment between all these routers.

To handle routing in this environment, the IP filter will maintain an Ethernet table. For every packet that is forwarded from the private to public side, if a translation entry exists, use its Ethernet index to compare with the Ethernet source address of the incoming packet. If they match, nothing more needs to be done. Otherwise, the Ethernet table is searched for the source Ethernet address, adding a new Ethernet table entry if not found. The index to the Ethernet table is then saved in the translation table entry. Then when a packet is being translated from the public to private side, the Ethernet address can be retrieved directly from the index in the translation table. Thus packets will be routed to the router which forwarded the packet to the IP filter.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A method of interfacing private and public data communications networks, through a filter node in communication with both networks, the filter node having an address known in the public network, comprising the steps of:

routing from nodes in the private network, to the filter node, outgoing data packets having destination information, which includes a destination address and a destination port, corresponding to nodes in the public network and having source information, which includes a source address and a source port, of the respective private network nodes;

for each outgoing data packet received from the private network, at the filter node, maintaining the source information taken from the outgoing data packet in correlation with a unique value representing a port of the filter node, and replacing in the outgoing data packet the source address with the filter node address and the source port with the filter node port value; and routing from the filter node, to nodes in the public network, the outgoing data packets having the replaced source information, according to the destination information in each, to the corresponding public network nodes.

2. A method as claimed in claim 1, comprising the steps of:

routing from nodes in the public network, to the filter node, incoming data packets each having the address of the filter node as the destination address;

for each incoming data packet received from the public network, at the filter node, correlating the destination port of the destination information in the incoming data packet to particular source information being maintained and replacing, in the incoming data packet, the destination information with the particular source information;

routing from the filter node, in the private network, the incoming data packets having the replaced destination information to the corresponding private network nodes.

3. A method as claimed in claim 2, comprising ignoring by the filter node any incoming data packet received from the public network, if the destination port of the destination information in that incoming data packet can not be correlated to the maintained source information.

4. A method as claimed in claim 3, wherein maintaining the source information includes storing the source information from each outgoing data packet as an entry in a lookup table, and the filter node port value correlating to the source information constitutes an index into the table for that entry.

5. A method as claimed in claim 4, wherein the incoming and outgoing data packets include packets in accordance with a transmission control protocol (TCP) over an internet protocol (IP).

6. A method of interfacing private and public data communications networks, through a filter node in communication with both networks, the filter node having an address known in the public network, comprising the steps of:

routine from nodes in the private network, to the filter node, outgoing data packets having destination information, which includes a destination address and a destination port, corresponding to nodes in the public network and having source information, which includes a source address and a source port, of the respective private network nodes;

for each outgoing data packet received from the private network, at the filter node, maintaining the source information taken from the outgoing data packet in correlation with a unique value representing a port of the filter node, and replacing in the outgoing data packet the source address with the filter node address and the source port with the filter node port value;

routing from the filter node, to nodes in the public network, the outgoing data packets having the replaced source information, according to the destination information in each, to the corresponding public network nodes;

routing from nodes in the public network, to the filter node, incoming data packets each having the address of the filter node as the destination address;

for each incoming data packet received from the public network, at the filter node, correlating the destination port of the destination information in the incoming data packet to particular source information being maintained and replacing, in the incoming data packet, the destination information with the particular source information;

routing from the filter node, in the private network, the incoming data packets having the replaced destination information to the corresponding private network nodes;

ignoring by the filter node any incoming data packet received from the public network, if the destination port of the destination information in that incoming data packet can not be correlated to the maintained source information, wherein maintaining the source information includes storing the source information from each outgoing data packet as an entry in a lookup table, and the filter node port value correlating to the source information constitutes an index into the table for that entry;

wherein the incoming and outgoing data packets include packets in accordance with a transmission control protocol (TCP) over an internet protocol (IP); and receiving at the filter node an outgoing TCP packet from the private network; and if an entry corresponding to the outgoing TCP packet is not found in the lookup table and the outgoing TCP packet indicates that this is a connection request, storing the source information together with the destination information from the outgoing TCP packet as a new entry in the lookup table.

7. A method as claimed in claim 6, comprising receiving at the filter node an incoming TCP packet from the public network; and if the source port in the received incoming TCP packet is different from the destination port in a source information entry of the lookup table, indexed by the destination port in the outgoing TCP packet, and if the incoming TCP packet indicates that this packet is a first response to the connection request, then updating by the filter node the destination port in the table entry with the source port from the received incoming TCP packet.

8. A method as claimed in claim 7, comprising receiving at the filter node any incoming TCP packet having an end of transmission code in the packet and zeroing an entry in the lookup table corresponding to that received incomingTCP packet.

9. A method as claimed in claim 4, wherein the data packets include packets in accordance with a user datagram protocol (UDP) over an internet protocol (IP).

10. A method of interfacing private and public data communications networks, through a filter node in communication with both networks, the filter node having an address known in the public network, comprising the steps of:

routing from nodes in the private network, to the filter node, outgoing data packets having destination information, which includes a destination address and a destination port, corresponding to nodes in the public network and having source information, which includes a source address and a source port, of the respective private network nodes;

for each outgoing data packet received from the private network, at the filter node, maintaining the source information taken from the outgoing data packet in correlation with a unique value representing a port of the filter node, and replacing in the outgoing data packet the source address with the filter node address and the source port with the filter node port value;

routing from the filter node, to nodes in the public network, the outgoing data packets having the replaced source information, according to the destination information in each, to the corresponding public network nodes;

routing from nodes in the public network, to the filter node, incoming data packets each having the address of the filter node as the destination address;

for each incoming data packet received from the public network, at the filter node, correlating the destination port of the destination information in the incoming data packet to particular source information being maintained and replacing, in the incoming data packet, the destination information with the particular source information;

routing from the filter node, in the private network, the incoming data packets having the replaced destination information to the corresponding private network nodes:

ignoring by the filter node any incoming data packet received from the public network, if the destination port of the destination information in that incoming data packet can not be correlated to the maintained source information, wherein maintaining the source information includes storing the source information from each outgoing data packet as an entry in a lookup table, and the filter node port value correlating to the source information constitutes an index into the table for that entry;

wherein the data packets include packets in accordance with a user datagram protocol (UDP) over an internet protocol (IP); and receiving at the filter node a UDP data packet from the private network, and adding the source information and the destination information from the UDP packet together with an interval indication for an expiration timer as a new entry in the lookup table.

11. A method of interfacing private and public data communications networks, through a filter node in communication with both networks, comprising the steps of:

(a) receiving at the filter node, from the private network, a data packet having a destination address corresponding to a node in the public network and a source address corresponding to a node in the private network;

(b) maintaining, by the filter node, the source address taken from the data packet;

(c) replacing, in the data packet, the source address with an address of the filter node, wherein the source address includes a port number of the node in the private network and the address of the filter node includes a port number of the filter node;

(d) routing from the filter node, in the public network, the data packet having the replaced source address, according to the destination address, to the corresponding public node network;

(e) waiting for a return packet from the public network, responsive to the data packet having the replaced source information;

(f) replacing, in the return packet, the destination address with the maintained source address; and (g) routing from the filter node, in the private network, the return packet having the replaced destination address to the corresponding private network node.

12. A method as claimed in claim 11, comprising buffering, at the filter node, further data packets received from the private network while waiting for the return packet, and repeating steps (b) through (g) on an individual basis for the further packets, if any, that were buffered.

13. A method as claimed in claim 12, wherein the data packets include packets in accordance with an internet control message protocol (ICMP).

14. A method of operating a filter node for interfacing first and second data communications networks, comprising the steps of:

receiving from the first network, an outgoing data packet having destination information, which includes a destination address and a destination port, corresponding to a node in the second network and having source information, which includes a source address and a source port, corresponding to a node in the first network;

maintaining the source information taken from the outgoing data packet in correlation with a unique value representing a port of the filter node;

replacing in the outgoing data packet the source address with an address of the filter node and the source port with the filter node port value; and sending to the second network the outgoing data packet having the replaced source information, whereby the packet is routed according to its destination information to the corresponding second network node.

15. A method as claimed in claim 14, further comprising the steps of:

receiving from the second network, an incoming data packet having the address of the filter node as the destination address;

correlating the destination port of the destination information in the incoming data packet to particular source information being maintained;

replacing, in the incoming data packet, the destination information with the particular source information;

sending to the first network the incoming data packet having the replaced destination information, whereby that packet is routed according to its destination information to the corresponding first network node.

16. A method as claimed in claim 15, comprising ignoring the incoming data packet received from the second network, if the destination port of the destination information in that data packet can not be correlated to the maintained source information.

17. A method as claimed in claim 16, wherein maintaining the source information includes storing the source information from the outgoing data packet as an entry in a lookup table, and the filter node port value correlating to the source information constitutes an index into the table for that entry.

18. A method as claimed in claim 17, wherein the incoming and outgoing data packets include packets in accordance with a transmission control protocol (TCP) over an internet protocol (IP).

19. A method of operating a filter node for interfacing first and second data communications networks comprising the steps of:

receiving from the first network, an outgoing data packet having destination information, which includes a destination address and a destination port, corresponding to a node in the second network and having source information, which includes a source address and a source port, corresponding to a node in the first network:

maintaining the source information taken from the outgoing data packet in correlation with a unique value representing a port of the filter node;

replacing in the outgoing data packet the source address with an address of the filter node and the source port with the filter node port value;

sending to the second network the outgoing data packet having the replaced source information, whereby that packet is routed according to its destination information to the corresponding second network node, receiving from the second network, an incoming data packet having the address of the filter node as the destination address:

correlating the destination port of the destination information in the incoming data packet to particular source information being maintained;

replacing, in the incoming data packet, the destination information with the particular source information;

sending to the first network the incoming data packet having the replaced destination information whereby that packet is routed according to its destination information to the corresponding first network node;

ignoring the incoming data packet received from the second network, if the destination port of the destination information in that data packet can not be correlated to the maintained source information, wherein maintaining the source information includes storing the source information from the outgoing data packet as an entry in a lookup table, and the filter node port value correlating to the source information constitutes an index into the table for that entry wherein the incoming and outgoing data packets include packets in accordance with a transmission control protocol (TCP) over an internet protocol (IP): and receiving an outgoing TCP packet from the first network; and if an entry corresponding to the outgoing TCP packet is not found in the lookup table and the outgoing TCP packet indicates that this is a connection request, storing the source information together with the destination information from the TCP packet as a new entry in the lookup table.

20. A method as claimed in claim 19, comprising receiving any incoming TCP packet from the second network; and if the source port in that received incoming TCP packet is different from the destination port in a source information entry of the lookup table, indexed by the destination port in the outgoing TCP packet, and if that incoming TCP packet indicates that it is a first response to the connection request, then updating the destination port in the table entry with the source port from that received incoming TCP packet.

21. A method as claimed in claim 20, comprising receiving any incoming TCP packet having an end of transmission code in the packet, and zeroing an entry in the lookup table corresponding to that received incoming TCP packet.

22. A method as claimed in claim 17, wherein the outgoing and incoming data packets include packets in accordance with a user datagram protocol (UDP) over an internet protocol (IP).

23. A method of operating a filter node for interfacing first and second data communications networks, comprising the steps of:

receiving from the first network, an outgoing data packet having destination information, which includes a destination address and a destination port, corresponding to a node in the second network and having source information, which includes a source address and a source port, corresponding to a node in the first network:

maintaining the source information taken from the outgoing data packet in correlation with a unique value representing a port of the filter node;

replacing in the outgoing data packet the source address with an address of the filter node and the source port with the filter node port value;

sending to the second network the outgoing data packet having the replaced source information, whereby that packet is routed according to its destination information to the corresponding second network node;

receiving from the second network, an incoming data packet having the address of the filter node as the destination address;

correlating the destination port of the destination information in the incoming data packet to particular source information being maintained;

replacing, in the incoming data packet, the destination information with the particular source information;

sending to the first network the incoming data packet having the replaced destination information, whereby that packet is routed according to its destination information to the corresponding first network node; and ignoring the incoming data packet received from the second network, if the destination port of the destination information in that data packet can not be correlated to the maintained source information, wherein maintaining the source information includes storing the source information from the outgoing data packet as an entry in a lookup table, and the filter node port value correlating to the source information constitutes an index into the table for that entry;

wherein the outgoing and incoming data packets include packets in accordance with a user datagram protocol (UDP) over an internet protocol (IP); and receiving a UDP data packet from the first network, and adding the source information and the destination information from the UDP packet together with an interval indication for an expiration timer as a new entry in the lookup table.

24. A method of operating a filter node for interfacing first and second data communications networks, comprising the steps of:

(a) receiving from the first network, a data packet having a destination address corresponding to a node in the second network and a source address corresponding to a node in the first network;

(b) maintaining the source address taken from the data packet;

(c) replacing, in the data packet, the source address with an address of the filter node, wherein the source address includes a source port number and the address of the filter node includes a port number of the filter node;

(d) sending to the second network the data packet having the replaced source address, whereby that packet is routed to the corresponding second network node;

(e) receiving a return packet from the second network, responsive to the data packet having the replaced source information;

(f) replacing, in the return packet, the destination address with the maintained source address; and (g) sending to the first network the return packet having the replaced destination address, whereby that packet is routed to the corresponding first network node.

25. A method as claimed in claim 24, comprising buffering further data packets received from the first network while waiting for the return packet, and repeating steps (b) through (g) on an individual basis for the further packets, if any, that were buffered.

26. A method as claimed in claim 25, wherein the data packets include packets in accordance with an internet control message protocol (ICMP).

27. A filter node for interfacing first and second data communications networks, comprising:

means for receiving from the first network, a data packet having destination information, which includes a destination address and a destination port, corresponding to a node in the second network and having source information, which includes a source address and a source port, corresponding to a node in the first network;

means for maintaining the source information taken from the data packet in correlation with a unique value representing a port of the filter node;

means for replacing in the data packet the source address with an address of the filter node and the source port with the filter node port value; and means for sending to the second network, the data packet having the replaced source information, whereby that packet is routed according to its destination information to the corresponding second network node.

28. A filter node as claimed in claim 27, comprising:

means for receiving from the second network, a data packet having the address of the filter node as the destination address;

means for correlating the destination port of the destination information in the data packet to particular source information being maintained;

means for replacing, in the data packet, the destination information with the particular source information; and means for sending to the first network the data packet having the replaced destination information, whereby that packet is routed according to its destination information to the corresponding first network node.

29. A filter node as claimed in claim 28, comprising means for ignoring a data packet received from the second network, if the destination port of the destination information in that data packet can not be correlated to the maintained source information.

30. A filter node as claimed in claim 29, wherein the means for maintaining the source information includes means for storing the source information from the data packet as an entry in a lookup table, and wherein the filter node port value correlating to the source information constitutes an index into the table for that entry.

31. A filter node for interfacing first and second data communications networks, comprising:

(a) means for receiving from the first network, a data packet having a destination address corresponding to a node in the second network;

(b) means for maintaining the source address taken from the data packet;

(c) means for replacing, in the data packet, the source address with an address of the filter node, wherein the source address includes a source port number and the address of the filter node includes a port number of the filter node;

(d) means for sending to the second network the data packet having the replaced source address, whereby that packet is routed to the corresponding second network node;

(e) means for receiving a return packet from the second network, responsive to the data packet having the replaced source information;

(f) means for replacing, in the return packet, the destination address with the maintained source address; and (g) means for sending to the first network the return packet having the replaced destination address, whereby that packet is routed to the corresponding the first network node.

32. A filter node as claimed in claim 31, comprising means for buffering further data packets received from the first network while waiting for the return packet, and means for controlling means (b) through (g) on an individual basis for processing the further packets, if any, that were buffered.

* * * * *